United States Patent
Spieker et al.

(10) Patent No.: US 9,827,961 B2
(45) Date of Patent: Nov. 28, 2017

(54) METHOD FOR DETECTING BRAKE CIRCUIT FAILURE

(75) Inventors: Arnie Spieker, Commerce Township, MI (US); Mark D. Lubbers, Ann Arbor, MI (US); Michael O'Connor, Royal Park, MI (US)

(73) Assignee: Kelsey-Hayes Company, Livonia, MI (US)

( * ) Notice: Subject to any disclaimer, the term of this patent is extended or adjusted under 35 U.S.C. 154(b) by 1553 days.

(21) Appl. No.: 11/661,539

(22) PCT Filed: Aug. 26, 2005

(86) PCT No.: PCT/US2005/030521
§ 371 (c)(1),
(2), (4) Date: Aug. 20, 2007

(87) PCT Pub. No.: WO2006/026490
PCT Pub. Date: Mar. 9, 2006

(65) Prior Publication Data
US 2008/0246335 A1      Oct. 9, 2008

Related U.S. Application Data

(63) Continuation-in-part of application No. 10/928,800, filed on Aug. 27, 2004, now abandoned.

(51) Int. Cl.
*B60T 8/88* (2006.01)
*B60T 13/74* (2006.01)

(52) U.S. Cl.
CPC ......... *B60T 8/885* (2013.01); *B60T 2270/403* (2013.01); *B60T 2270/413* (2013.01)

(58) Field of Classification Search
CPC ... B60T 8/88; B60T 8/885; B60T 8/00; B60T 8/171; B60T 8/172; B60T 17/18;
(Continued)

(56) References Cited

U.S. PATENT DOCUMENTS

| 5,276,624 A | 1/1994 | Ito et al. |
| 5,671,981 A | 9/1997 | Sasaki et al. |

(Continued)

FOREIGN PATENT DOCUMENTS

| DE | 19628217 | 1/1998 |
| DE | 19628217 A1 | 1/1998 |

(Continued)

OTHER PUBLICATIONS

English Machine Translation of DE-19628217.*
German Office Action, Application No. De 11 2005 002 0665, dated Nov. 19, 2015.

*Primary Examiner* — Melody Burch
(74) *Attorney, Agent, or Firm* — MacMillan, Sobanski & Todd, LLC

(57) ABSTRACT

A method is provided for detecting a fault condition in a hydraulic brake system of a vehicle having a first hydraulic brake circuit and a second hydraulic brake circuit. A correlation ratio is determined between a measured pressure and the actual vehicle acceleration. A first wheel velocity differential is determined and a second wheel velocity differential is determined. A weighting value is selected in response to determining whether the correlation ratio is within the predetermined range and whether the first wheel velocity differential and the second wheel velocity differential are opposite signs. The selected weighting value is added to a fault counter. A determination is made whether the fault counter is equal to or greater than a predetermined threshold. A fault condition is detected in response to the fault counter greater than or equal to the first predetermined threshold.

15 Claims, 6 Drawing Sheets

(58) Field of Classification Search
CPC ...... B60T 17/22; B60T 17/221; B60T 17/226; B60T 2270/413; B60T 2270/403; B60T 2270/40
USPC .... 303/122, 122.02, 122.03, 122.09, 122.13, 303/145, 163, 186, DIG. 1, DIG. 2; 701/70, 71, 75, 76
See application file for complete search history.

(56) References Cited

U.S. PATENT DOCUMENTS

| | | |
|---|---|---|
| 6,007,164 A | 12/1999 | Sakai et al. |
| 6,196,643 B1 * | 3/2001 | Yokoyama et al. .......... 303/166 |
| 6,212,459 B1 * | 4/2001 | Unterforsthuber ............. 701/70 |
| 6,299,261 B1 | 10/2001 | Weiberle et al. |
| 6,405,117 B1 | 6/2002 | Walenty et al. |
| 6,505,893 B2 | 1/2003 | Schmidt et al. |
| 2001/0054843 A1 * | 12/2001 | Schmidt et al. ......... 303/122.13 |
| 2002/0063469 A1 | 5/2002 | Nishio |
| 2003/0045989 A1 | 3/2003 | Walenty et al. |
| 2004/0108769 A1 | 6/2004 | Marathe |
| 2004/0135432 A1 | 7/2004 | Reuter et al. |
| 2004/0183373 A1 * | 9/2004 | Yonemura et al. ........... 303/191 |
| 2008/0246335 A1 * | 10/2008 | Spieker et al. .......... 303/122.08 |

FOREIGN PATENT DOCUMENTS

| | | |
|---|---|---|
| DE | 19732884 A1 | 2/1998 |
| DE | 10156415 A1 | 5/2002 |
| DE | 69628875 T2 | 1/2004 |
| EP | 1104731 | 6/2001 |
| EP | 1104731 A2 | 6/2001 |

* cited by examiner

METHOD FOR DETECTING BRAKE CIRCUIT FAILURE

CROSS REFERENCE TO RELATED APPLICATIONS

This application is the U.S. national phase of International Application No. PCT/US2005/030521, filed Aug. 26, 2005, which claims priority to U.S. Non-Provisional application Ser. No. 10/928,800, filed Aug. 27, 2004. The disclosures of both applications are incorporated herein by reference.

STATEMENT REGARDING FEDERALLY SPONSORED RESEARCH

Not Applicable.

BACKGROUND OF THE INVENTION

Field of the Invention

The present invention relates in general to detecting a hydraulic brake circuit failure within a split vehicle braking system, and more particularly, to detecting a hydraulic brake circuit failure while requiring a pressure sensor in only one of the two hydraulic brake circuits.

Description of the Related Art

Vehicle braking systems commonly include a master cylinder and reservoir for providing pressurized brake fluid to hydraulic brake circuits for actuating vehicle brakes. Vehicle braking systems typically include two hydraulic brake circuits for actuating a respective set of vehicle brakes. During vehicle stability control mode, as a driver of the vehicle asserts a force on the brake pedal of a vehicle, the master cylinder (M/C) pressure is typically measured by a respective pressure sensor in each hydraulic brake circuit or other type of sensing device which determines the M/C pressure within each of the hydraulic brake circuits (e.g., pressure switch or a brake pedal travel sensor measuring the distance the brake pedal has traveled) for determining the drivers braking demands. Based on the braking demands received from the sensing devices, a motor, pump, and associated valves provide pressurized hydraulic brake fluid to the vehicle brake actuators for actuating the vehicle brakes. The pressurized hydraulic brake force applied to the vehicle brake actuators is directly correlated to the driver's braking demands (the M/C pressure as measured in both hydraulic circuits).

Some vehicle braking systems may include secondary assist brake functions. Such secondary assist brake functions provide anti-lock braking (ABS), traction control (TC), and yaw stability control (YSC) functions. These secondary assist brake functions supplement the driver actuated hydraulic brake system. For example, the ABS system pulsates the braking system if the operator of the vehicle locks the brakes so as prevent the vehicle from skidding and to shorten the braking distance traveled of the vehicle. Each of the assisted brake functions provides some type of added vehicle braking or vehicle stability control utilizing either one or more brakes individually or in combination. The secondary brake assist functions require additional pressure above the driver applied M/C pressure. For example, for the YSC function, the M/C pressure is used as a reference for the pressure target of an isolated circuit. During YSC control, pressure for an isolated circuit is required to be increased above the M/C pressure (i.e., YSC+M/C pressure$_{measured}$). A pressure controller and pressure estimate is used to deliver the required pressure to the wheels of the isolated circuit for applying the secondary assist brake function. These functions typically are automatically activated usually without awareness of the driver.

When a hydraulic brake circuit failure is detected, secondary assist braking functions, such as anti-lock braking, traction control, yaw stability control, may be deactivated for allowing the operator of the vehicle to slow down or stop the vehicle on its own without any assistance from secondary assist braking functions. The reason is to prevent any automated braking actions, which are activated by the secondary assist braking functions, from interfering with the driver's intended braking demands. For example, if the hydraulic brake failure is occurring, and the driver wants to stop immediately, the assisted braking cannot sense this issue or condition the driver is faced with and may attempt a vehicle stability control operation that is not in cooperation with the drivers intended braking operation.

To detect a hydraulic brake circuit failure a pressure sensor is provided for each hydraulic brake circuit in the vehicle. Typically there are two hydraulic brake circuits for providing hydraulic brake fluid to a respective wheel or sets of wheels. In a two hydraulic brake circuit system, each hydraulic brake circuit provides hydraulic brake fluid to a respective pair of vehicle brakes and two pressure sensors are often utilized. Alternatively, in the two hydraulic brake circuit system, a pressure sensor could be utilized on a first hydraulic brake circuit and a pressure switch could be utilized on the second hydraulic brake circuit. Each pressure sensor or switch provides a signal indicative of the fluid pressure within a respective circuit.

To properly utilize the assisted brake functions, it must be known whether both hydraulic brake circuits are functioning properly, otherwise the assisted brake functions could ignore the drivers intended braking demands. If only one pressure sensor was utilized within a braking system utilizing two hydraulic brake circuits, then such a failure could go undetected. For example, if a failure occurred in the sensed circuit, the pressure sensor measuring pressure on the sensed line would provide a M/C pressure measurement of approximately zero. The unsensed circuit, in this example, would have a M/C pressure greater than zero. However, without a second sensor (or other type of indicator) in the unsensed circuit for comparing the pressure within the two hydraulic brake circuits, a potential fault condition may go undetected and braking system would not recognize the drivers braking demands as the M/C pressure is zero in the sensed circuit. As a result, minimum or no braking force would be applied to the vehicle brakes in YSC control modes.

In the event of a failure of an unsensed line, the pressure sensor would measure the pressure applied within the sensed circuit (non-failed circuit) and would provide a signal to the motor, pump and associated valves to supply pressurized hydraulic brake fluid to the vehicle brake actuators. However, zero or minimal pressure will be generated in the unsensed (failed) circuit, and as a result, only a portion of the vehicle braking would be applied.

The hydraulic brake failure would remain undetected in both situations without some secondary method of verifying the hydraulic brake failure, secondary assist brake functions would remain active. Such braking function could potentially conflict with the driver's immediate braking demands. Thus, in YSC systems, it is critical to utilize a pressure sensor in each hydraulic brake circuit, or other device (e.g., pressure differential switch) to detect the failure, however, the addition of a pressure sensor for each additional circuit in a braking system becomes costly.

SUMMARY OF THE INVENTION

The present invention has the advantage of detecting a fault condition in a hydraulic braking system utilizing at least two hydraulic brake circuits and only one pressure sensor for a respective hydraulic brake circuit and for deactivating at least one assisted brake function in response to detecting said fault condition.

In one aspect of the present invention, a method is provided for detecting a fault condition in a hydraulic brake system of a vehicle having a first hydraulic brake circuit for actuating a first set of vehicle brake actuators for a first set of wheels and a second hydraulic brake circuit for actuating a second set of vehicle brake actuators for a second set of wheels. The first hydraulic brake circuit includes a pressure sensor. Pressure within the first hydraulic brake circuit of the vehicle is measured using the pressure sensor. An actual vehicle acceleration of the vehicle is determined. A correlation ratio between the pressure and the actual vehicle acceleration is determined. A determination is made whether the correlation ratio is within a predetermined range. A wheel velocity of each wheel is measured. A first wheel velocity differential is determined between a first wheel of the first set of wheels and a first wheel of the second set of wheels. A second wheel velocity differential is determined between a second wheel of the first set of wheels and a second wheel of the second set of wheels. A determination is made whether the first wheel velocity differential and the second wheel velocity differential are opposite signs. A weighting value is selected in response to determining whether the correlation ratio is with in the predetermined range and whether the first wheel velocity differential and the second wheel velocity differential are opposite signs. The selected weighting value is added to a fault counter. A determination is made whether the fault counter is equal to or greater than a predetermined threshold. A fault condition is detected in response to the fault counter greater than or equal to the first predetermined threshold.

In yet another aspect of the present invention, a method is provided for detecting a fault condition in a hydraulic brake system of a vehicle having a first hydraulic brake circuit for actuating a first set of vehicle brake actuators for a first set of wheels and a second hydraulic brake circuit for actuating a second set of vehicle brake actuators for a second set of wheels. The first hydraulic brake circuit includes a pressure sensor. Pressure within the first hydraulic brake circuit of the vehicle is measured using the pressure sensor. An actual vehicle acceleration of the vehicle is determined. A correlation ratio between the pressure and the actual vehicle acceleration is determined. A determination is made whether the correlation ratio is within a predetermined range. A wheel velocity of each wheel is measured. A first wheel velocity differential is determined between a first wheel of the first set of wheels and a first wheel of the second set of wheels. A second wheel velocity differential is determined between a second wheel of the first set of wheels and a second wheel of the second set of wheels. A determination is made whether the first wheel velocity differential and the second wheel velocity differential are opposite signs. The fault condition is detected in response to determining the first wheel velocity differential and the second wheel velocity differential are opposite signs and in response to determining whether the correlation ratio is within the predetermined range.

In yet another aspect of the present invention, a method is provided for detecting a fault condition in a hydraulic brake system of a vehicle having a first hydraulic brake circuit for actuating a first set of vehicle brake actuators for a first set of wheels and a second hydraulic brake circuit for actuating a second set of vehicle brake actuators for a second set of wheels. The first hydraulic brake circuit includes a pressure sensor. A pressure is measured within the first hydraulic brake circuit using the pressure sensor. An expected vehicle acceleration is estimated in response to the measured pressure. An actual vehicle acceleration is determined. A fault condition is detected in response to a comparison of said actual acceleration and said expected acceleration.

In yet another aspect of the present invention, a method is provided for detecting a fault condition in a hydraulic brake system of a vehicle having a first hydraulic brake circuit for actuating a first set of vehicle brake actuators for a first set of wheels and a second hydraulic brake circuit for actuating a second set of vehicle brake actuators for a second set of wheels. The first hydraulic brake circuit includes a pressure sensor. A wheel velocity of each wheel of the vehicle is measured. A first wheel velocity differential is determined between a first wheel of the first set of wheels and a first wheel of the second set of wheels. A second wheel velocity differential is determined between a second wheel of the first set of wheels and a second wheel of the second set of wheels. A determination is made whether the first wheel velocity differential and the second wheel velocity differential are opposite signs. A fault condition is detected in response to said first wheel velocity differential and said second wheel velocity differential satisfying a predetermined condition.

In yet another aspect of the present invention, a method is provided for detecting a fault condition in a hydraulic brake system of a vehicle having a first hydraulic brake circuit for actuating a first set of vehicle brake actuators for a first set of wheels and a second hydraulic brake circuit for actuating a second set of vehicle brake actuators for a second set of wheels. The first hydraulic brake circuit includes a pressure sensor. A pressure is measured within the first hydraulic brake circuit using the pressure sensor. An expected vehicle acceleration is estimated in response to the measured pressure. An actual vehicle acceleration is determined. A determination is made whether the expected vehicle acceleration is within a predetermined range of the actual acceleration. Providing that the vehicle acceleration and the actual vehicle acceleration are within the predetermined range, then determining a first wheel velocity differential between a first wheel of the first set of wheels and a first wheel of the second set of wheels and determining a second wheel velocity differential between a second wheel of the first set of wheels and a second wheel of the second set of wheels. Detecting the fault condition in response to the first wheel velocity differential and the second wheel velocity differential satisfying a predetermined condition.

In yet another aspect of the present invention, a method is provided for detecting a fault condition in a hydraulic brake system of a vehicle having a first hydraulic brake circuit for actuating a first set of vehicle brake actuators for a first set of wheels and a second hydraulic brake circuit for actuating a second set of vehicle brake actuators for a second set of wheels. The first hydraulic brake circuit includes a pressure sensor. A wheel velocity of each wheel is measured. A first wheel velocity differential is determined between a first wheel of the first set of wheels and a first wheel of the second set of wheels. A second wheel velocity differential is determined between a second wheel of the first set of wheels and a second wheel of the second set of wheels. A determination is made whether the first wheel velocity differential and the second wheel velocity differential are opposite signs. If the first wheel velocity differential and the second wheel velocity differential are opposite signs, then measuring a pressure within the first hydraulic brake circuit of the vehicle using the pressure sensor. An expected vehicle acceleration is estimated in response to the measured pressure. An actual vehicle acceleration is determined. Determining if the expected vehicle acceleration is within a predetermined range of the actual acceleration. Detecting the fault condition in response to the determining whether the estimated vehicle acceleration and the actual vehicle acceleration within the predetermined range.

In yet another aspect of the present invention, a vehicle control system is provided that includes a braking control system including a vehicle brake module that is operable in at least one operating state. A first circuit of pressurized brake fluid provides pressurized hydraulic brake fluid to a first set of brake actuators. A second circuit of pressurized brake fluid provides pressurized hydraulic brake fluid to a second set of brake actuators. A plurality of sensors monitors the wheel velocity and acceleration. A pressure sensor monitors a pressure within the first circuit of pressurized brake fluid. The vehicle brake module determines an estimated acceleration based on the pressure within the first hydraulic brake circuit and compares to the estimated acceleration to an actual acceleration. The vehicle brake module further determines a first wheel velocity differential and a second wheel velocity differential from the wheel velocity. The vehicle brake module deactivates the at least one operating state in response to the first wheel velocity differential and the second wheel velocity differential satisfying a predetermined condition and in response to the comparison of the actual acceleration and the estimated acceleration.

In yet another aspect of the present invention, a hydraulic brake circuit fault detection system is provided that includes a braking control system including a vehicle brake module that is operable in at least one operating state. A pressure sensor for monitoring a hydraulic brake circuit. A controller for receiving a plurality of vehicle operating inputs. The controller determining a first wheel speed differential of a first set of wheels and a second wheel speed differential of a second set of wheels and an expected acceleration in response to the received inputs. The controller compares the expected acceleration with an actual vehicle acceleration and determines a ratio flag condition in response to. The controller compares the first wheel velocity differential and the second wheel velocity differential and determines a slip flag condition in response to. The controller detects a fault condition in response to the ratio flag condition and the slip flag condition.

In yet another aspect of the present invention, a hydraulic brake circuit fault detection system is provided that includes a braking control system including a vehicle brake module that is operable in at least one operating state. A pressure sensor for monitoring a hydraulic brake circuit. A controller for receiving a plurality of vehicle operating inputs. The controller determining a first wheel speed differential of a first set of wheels and a second wheel speed differential of a second set of wheels and an expected acceleration in response to the received inputs. The controller compares the expected acceleration with an actual vehicle acceleration and determines a ratio flag condition in response to. The controller compares the first wheel velocity differential and the second wheel velocity differential and determines a slip flag condition in response to. The controller selects a weighting value in response to the ratio flag condition and the slip flag condition. The controller adds the selected weighting value to a fault count. The controller detects the fault condition if the fault count is greater than or equal to a first predetermined threshold.

DETAILED DESCRIPTION OF PREFERRED EMBODIMENTS

Figure 1:
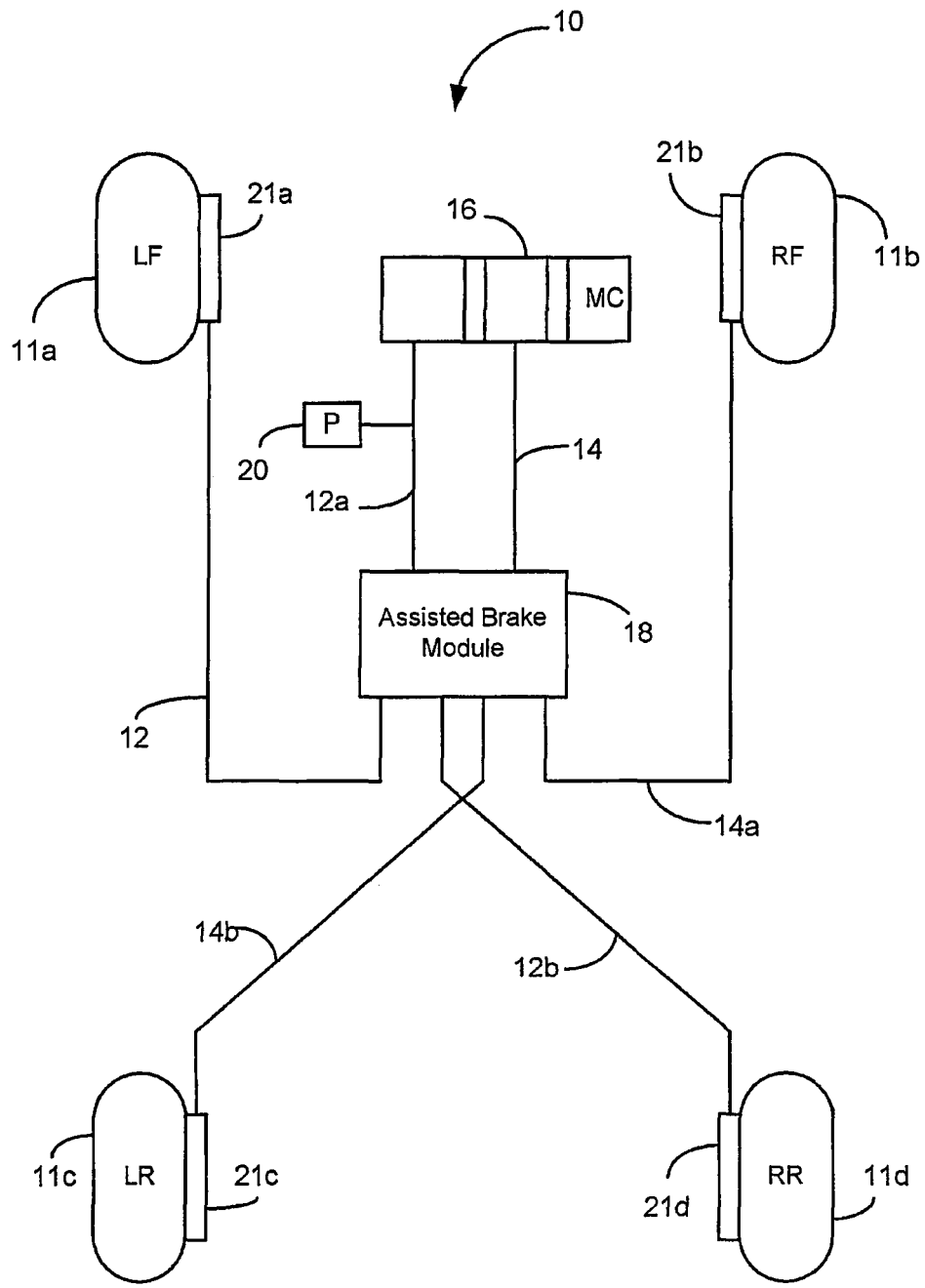
FIG. 1 is a schematic diagram of a hydraulic braking system according to the preferred embodiment of the present invention.

Referring now to the Drawings and particularly to FIG. 1, there is shown a schematic diagram of a hydraulic braking system for providing hydraulic brake fluid to a plurality of vehicle brake actuators. The hydraulic braking system is shown generally at 10. The hydraulic braking system 10 includes vehicle wheels 11a, b, c, and d. Vehicle brake actuators 21a, b, c, and d each include a respective brake actuation member (such as a slave cylinder) and friction member actuable by the actuation member for engaging a rotatable braking surface of the vehicle wheels 11a, b, c, and d, respectively. In the preferred embodiment, the vehicle braking system utilizes a diagonally split braking system. A first circuit of pressurized hydraulic brake fluid 12a and 12b (e.g., primary circuit) is provided for actuating vehicle brake actuators 21a and 21d. The second circuit of pressurized hydraulic brake fluid 14a and 14b (e.g., secondary circuit) is provided for actuating vehicle brake actuators 21b and 21c. In other preferred embodiments, a respective hydraulic brake circuit may actuate an axial set of vehicle brake actuators.

The source of pressurized brake fluid for the first circuit 12a,b and second circuit 14a,b is a manually operated master cylinder 16. The master cylinder is operated by a brake pedal to supply pressurized brake fluid to the first circuit 12a,b and the second circuit 14a,b. Typically the master cylinder 16 includes a tandem master cylinder, having two service pistons, but the master cylinder 16 may be of any suitable design.

A vehicle brake module 18 may include a vehicle stability control module in addition to a hydraulic braking boost system. The vehicle stability control (VSC) module may comprise ABS functionality, TC functionality, or YSC functionality. The vehicle brake module 18 receives pressurized hydraulic brake fluid from the first circuit 12a,b and the second circuit 14a,b. The vehicle brake module 18 outputs pressurized hydraulic brake fluid to the respective vehicle brake actuators via the first circuit 12a,b and the second circuit 14a,b. Various hydraulically controlled valves 30 (shown in FIG. 2) within the vehicle brake module 18 control the hydraulic pressure to the four vehicle brake actuators 21, a, b, c, and d either independently or in combination for performing various deceleration or stability control operations. A pressure sensor 20 is mounted to the first circuit 12a,b to sense pressure within the first circuit 12a,b, or alternatively, the pressure sensor 20 may be mounted to the second circuit 14a,b for sensing pressure within the second circuit 14a,b.

Figure 2:
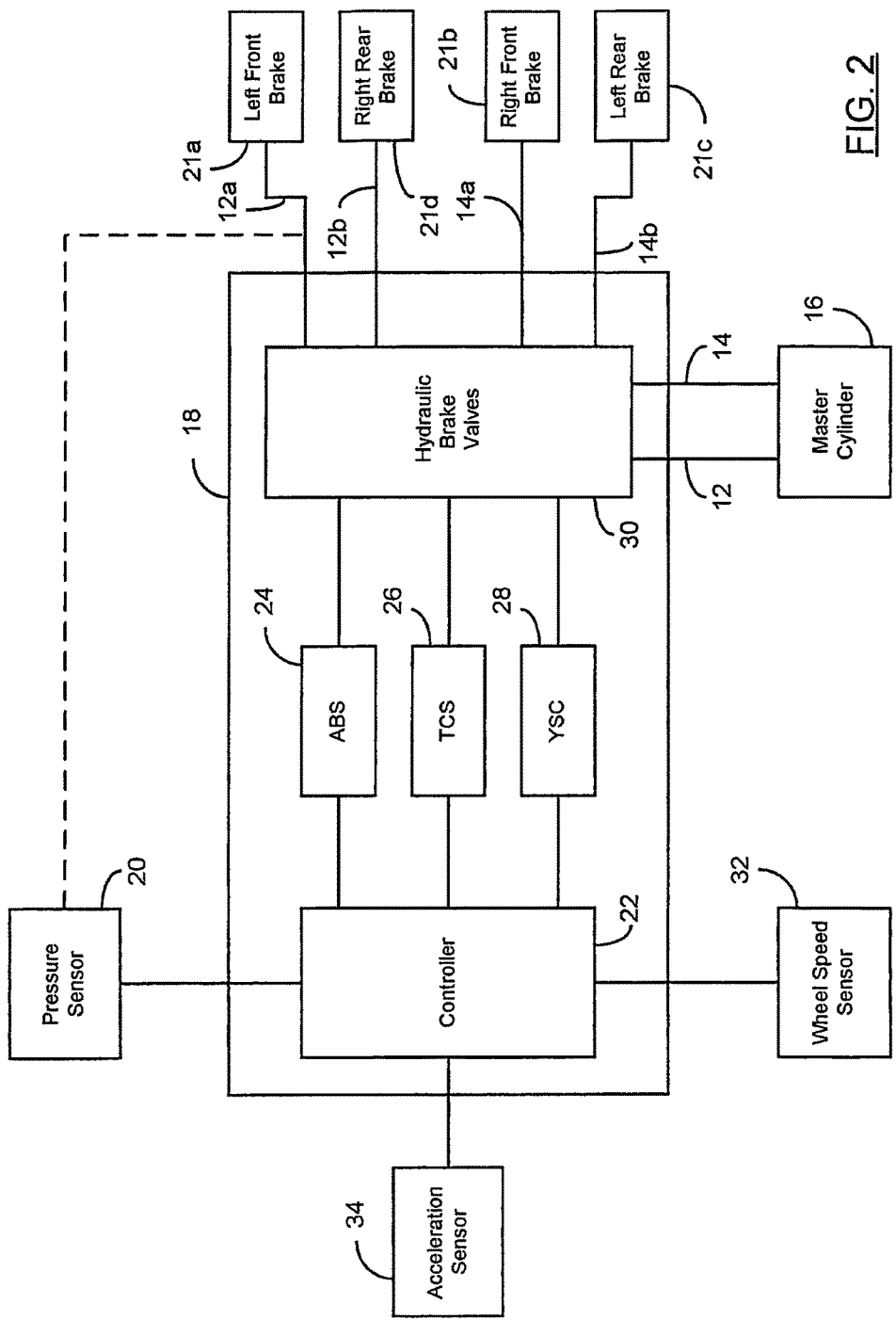
FIG. 2 is a block diagram of a system for detecting a failed hydraulic brake circuit according a preferred embodiment of the present invention.

FIG. 2 illustrates block diagram for detecting a failed hydraulic brake circuit. The vehicle brake module 18 includes a plurality of controls for controlling the actuation of the vehicle brakes 21a, b, c, and d. In the preferred embodiment, the vehicle brake module 18 includes a controller 22 for receiving input signals from a plurality of sensing devices. The plurality of sensing devices includes a pressure sensor 20, an acceleration sensor 34, and a wheel speed sensor 32.

The pressure sensor 20 senses the hydraulic brake pressure in the first circuit 12a,b and inputs a pressure signal to the controller 22. In the preferred embodiment, a plurality of sensors is used to determine both wheel speed and acceleration. A wheel speed sensor 32 senses the velocity of a wheel. A respective wheel speed sensor is disposed at each wheel location for sensing the velocity of a respective wheel. Preferably, the wheel speed sensors are used to determine the vehicle acceleration by measuring vehicle speed over various increments of time. Utilizing the wheel speed sensors to determine vehicle acceleration minimizes the complexity and cost of adding an additional sensor for measuring acceleration. Alternatively, an additional sensor such as an acceleration sensor 34 may be used to sense the acceleration of the vehicle. Acceleration may be a negative acceleration (i.e. deceleration) or a positive acceleration. In other preferred embodiments, the sensed acceleration may be supplied by other devices sensing the acceleration such as a powertrain control module which receives a sensed acceleration input from a driveshaft of the vehicle. The parameters sensed from the plurality of sensors are input to the controller 22 for determining a hydraulic brake failure in the sensed and unsensed hydraulic brake line.

The vehicle brake module 18 includes a plurality of vehicle stability modules for applying one or more secondary brake assist functions. The plurality of vehicle stability modules includes an ABS module 24 for operating in an anti-lock braking state, a TC module 26 for operating in a traction control state, and a YSC module 28 for operating in a yaw stability state. The plurality of vehicle stability modules provide signals to electrically controlled hydraulic brake valves 30 for modulating the braking pressure of each hydraulic circuit so to apply various braking and vehicle stability control strategies to the vehicle. The master cylinder 16 provides pressurized hydraulic brake fluid to the hydraulic brake valves 30 which are opened and closed depending on the braking strategy applied from the various controllers. In alternative embodiments, the plurality of vehicle stability controllers that control the assisted braking functions may be located exterior of the assisted braking module. If exterior, a communication line is coupled between a respective vehicle stability module and the vehicle brake module 18. In addition, a respective set of hydraulic brake valves for providing secondary brake assist functions for a respective vehicle stability function (e.g., ABS) may include a separate set of hydraulic valves disposed exterior of the vehicle brake module 18. This separate set of hydraulic valves would cooperatively work with hydraulic brake valves 30 to apply the respective braking function.

In the preferred embodiment, the pressure sensor 20 is connected to the first circuit 12a,b for measuring pressure within the first circuit 12a,b. A hydraulic brake failure in the first circuit 12a,b would result in a zero pressure measurement (or minimal pressure) of the first circuit 12a,b. Without a method for determining the hydraulic brake circuit failure, the system would view the zero pressure as a no brake applied condition and the driver demand pressure would not added to the second circuit applying YSC control functionality. This would result in ignoring the driver demanded braking. If a hydraulic brake failure occurs in the second hydraulic brake circuit 14a,b, then the hydraulic brake pressure will be zero in the second circuit 14a,b. However, since the pressure sensor 20 is measuring pressure in the circuit which it is attached to (i.e., the first circuit 12a,b), there will be no indication of a failure. Driver demand would be applied to the both circuits, however, the second circuit 14a,b may generate minimal or no braking pressure. To determine that a hydraulic brake failure in either circuit has occurred without adding a pressure sensor or pressure switch to the second circuit 14a,b and comparing the measured pressure of both circuits, other vehicle operating parameters are utilized.

The acceleration sensor 34 provides actual vehicle acceleration measurements to the controller 22. Other devices (not shown) such as the powertrain control module, wheel speed sensors may also be used to provide data to the controller 22 to determine acceleration. The acceleration data provides information as to whether the vehicle is decelerating (negative acceleration). The controller 22 also receives input data from the pressure sensor 20 that provides the measured hydraulic pressure from the first circuit 12a,b. A correlation ratio is determined by the controller 22 based on the input data. The correlation ratio is represented by the following formula:

$$C_f = P_m / A_x$$

where $C_f$ is the correlation factor, $P_m$ is the measured pressure of the first circuit, and $A_x$ is the measured vehicle acceleration (negative or positive).

This ratio indicates that for a respective negative acceleration (i.e., deceleration) the first hydraulic brake circuit 12a,b should indicate a respective increased pressure from the pressure sensor 20. This assumes that for a given amount of force exerted on the brake pedal, a resulting hydraulic pressure will be produced in a respective hydraulic brake circuit, resulting in a respective braking torque to all pressurized wheels, and a respective negative vehicle acceleration will be produced in response to the applied braking action unless there is a failure of pressure in the other circuit. Thus, for a given pressure, the vehicle should be decelerating within a respective predetermined range.

A hydraulic brake failure is determined based on whether the correlation ratio is within or outside of a predetermined range. For example, if the magnitude of the correlation ratio increases greater than 50%, then a determination is made that the second circuit 14a,b without the pressure sensor 20 could be failed. Alternatively, if the magnitude of the correlation ratio decreases by greater than 50% a determination can be made that the first circuit 12a,b with the pressure sensor 20 could be failed.

In one preferred embodiment, a method is provided for determining expected vehicle acceleration based on the measured brake pressure. The estimated vehicle acceleration is then compared to the actual vehicle acceleration for detecting a fault condition in one of the hydraulic brake circuits. A calculation may be performed to determine the expected vehicle acceleration or the expected vehicle acceleration may be determined solely on whether a zero or non-zero brake pressure is measured. That is, if brake pressure measured is a non-zero value, then a determination is made that expected vehicle acceleration is decelerating. If brake pressure is a zero value, then a determination is made that expected vehicle acceleration is not decelerating. A comparison is thereafter made with the actual vehicle acceleration to determine if the expected vehicle acceleration and actual vehicle acceleration are both showing deceleration or not.

A determination for detecting the fault condition in the hydraulic brake system may be based strictly on the determining the correlation ratio (or comparing estimated and actual acceleration); however, other factors aside from applying the vehicle brakes may be contribute to the vehicle having a negative acceleration without an expected increase in the pressure of one or both of the hydraulic brake circuits. Such factors include traveling up a steep incline without applying increased pressure on the accelerator to maintain velocity or shifting to a lower gear or neutral which would cause a negative acceleration without applying any braking force.

To increase the confidence level that a potential fault condition is occurring, a further determination is made whether a first and second wheel velocity differential satisfy a predetermined condition. The first wheel velocity differential is determined between a first wheel of a first set of wheels and a first wheel of a second set of wheels. A second wheel velocity differential is determined between a second wheel of a first set of wheels and a second wheel of a second set of wheels. Wheel velocity differential may be determined in response to a delta wheel slip between respective wheels. For a diagonal split system, the delta slips for a front set of wheels and a rear set of wheels are as follows:

$$\text{Delta slip}_{front} = (V_{lf} - V_{rf})/V_{lf}$$

and $$\text{Delta slip}_{rear} = (V_{lr} - V_{rr})/V_{lr}$$

where $V_{lf}$ is the velocity of the left-front wheel, $V_{lr}$ is the velocity of the left-rear wheel, $V_{rf}$ is the velocity of the right-front wheel, and $V_{rr}$ is the velocity of the right-rear wheel.

If a hydraulic failure is occurring in one of the two hydraulic circuits, then the failed circuit will not receive the braking demands as desired by the driver and only the non-failed circuit will have braking pressure. Since this will cause slip on the wheels of the non-failed circuit due to the braking pressure applied, two respective wheels (each wheel from a different braking circuit) will be traveling at different velocities. Based on the delta slip calculations above, two respective wheels from the different braking circuits will result in a negative delta slip and the two other respective wheels from the different braking circuits will result in a positive delta slip. The following formula is one example of satisfying a predetermined condition in determining whether a hydraulic brake failure is occurring based on the front and rear delta slips:

$$\text{Delta slip}_{front} * \text{Delta slip}_{rear} < 0$$

Based on the product of the above formula, the product of an axle having a negative delta slip and an axle having a positive delta slip will be negative. Therefore, a hydraulic brake failure is assumed when the product is negative. However, other factors may contribute to the vehicle having a negative delta wheel slip while a hydraulic brake failure is occurring. An example of when a hydraulic brake circuit failure is present but the resulting delta slip product is positive is when a vehicle is turning.

Both methods may be used independently to determine a hydraulic brake pressure fault condition, however, by filtering the results of each method so as to satisfy both conditions (circuit pressure versus acceleration and wheel slip differential) increases the confidence level for detecting a failed brake circuit. If the failed brake circuit is detected, then one or more of the vehicle stability functions of the vehicle brake module 18 (such as the ABS 24, TC 26, and YSC 28) are deactivated so that such automated functions will not interfere with the driver's braking demands.

The above detection method is utilized to determine if the system is operational. In addition, another system check may be made for further enhancing the robustness of the detection method for eliminating any false detections. If, for example, a main concern is whether the primary circuit (e.g., first circuit) has failed as opposed to the secondary circuit (e.g., second circuit), the difference between the delta slip of the front set of wheel (or front wheel velocity differential) and the delta slip of the rear set of wheels (or rear wheel velocity differential) may determine whether a primary circuit failure is occurring or a secondary failure circuit is occurring. This is represented by the following formula:

$$\text{Delta slip}_{front} - \text{Delta slip}_{rear} = \text{Delta difference}$$

where a positive delta difference would indicate a primary circuit failure, whereas a negative delta difference would indicate a secondary circuit failure. The control strategy of the detection system could thereafter indicate whether it would corrective actions for a primary circuit failure or for both primary and secondary circuit failures.

In another preferred embodiment, a wheel velocity differential between a respective pair of wheels may be used to determine wheel velocity differential, as opposed to the delta wheel slips, for determining the predetermined condition for detecting the potential fault condition. The following formula may be used for determining a respective wheel velocity differential for a respective pair of wheels:

$$\text{Wheel Velocity Differential}_{front} = (V_{lf} - V_{rf})$$

and $$\text{Wheel Velocity Differential}_{rear} = (V_{lr} - V_{rr})$$

Based on the wheel velocity differential calculations above, two respective wheels from the different braking circuits will result in a negative velocity differential and the two other respective wheels from the different braking circuits will result in a positive wheel velocity differential. The following formula is another example of satisfying a predetermined condition in determining whether a hydraulic brake failure is occurring based on the front and rear delta slips:

$$\text{Wheel Velocity Differential}_{front} * \text{Wheel Velocity Differential}_{rear} < 0$$

Based on the product of the above formula, the product of an axle having a negative wheel velocity differential and an axle having a positive wheel velocity differential will be negative. Therefore, a hydraulic brake failure is assumed when the product is negative. Alternatively, the signs of each wheel velocity differential calculation (i.e., front and rear)

are compared and a fault condition is detected if the signs are different (i.e., positive and negative) as opposed to determining the product in the mathematical calculation described herein.

In addition to filtering the results by each of the methods described and determining a fault condition in response to both operations, weighting values may be applied to the wheel slip and pressure-acceleration ratio results prior to filtering in order to minimize noise factors. Wheel slip or wheel velocity differential (hereafter referred to as slip flag) is less susceptible to noise factors than is the pressure to acceleration ratio (hereafter referred to as ratio flag). As a result, slip flag results are more reliable than the ratio flag results for detecting when a fault condition is occurring. Noise factors that impact the ratio flag include mass, grade, brake lining condition, braking surface, brake apply rate, and trailer towing. Noise factors that impact slip flag include brake lining condition, tire mismatches, braking surface, and 4WD engaged.

A weighting value is provided for the slip flag and the ratio flag depending upon the combined result of the ratio flag and slip flag. Since the slip flag is less susceptible to noise factors, the slip flag is weighted more heavily in comparison to the ratio flag which will be discussed in detail below.

A fault counter may be used to maintain a count for determining whether the summation of the weighting values are above a first predetermined threshold for detecting a fault condition during a single brake apply operation. A respective weighting value is set for each true and false condition of the slip flag and ratio flag. Multiple weighting values are determined and summed during a single brake apply operation. When the counter reaches a first predetermined threshold, a fault condition is detected. The first predetermined threshold can be set to a respective count number. The criteria for establishing the respective count number depends upon the vehicle characteristics which includes but is not limited to braking architecture, braking functionality and operations, and susceptibility to noise factors. This process makes the detection robust against false detections in the slip flag and the ratio flag caused by noise factors as discussed earlier. Basing the detection on the two vehicle conditions (i.e., ratio flag and slip flag) and a count set to a predetermined threshold makes the detection process more reliable than either using a single vehicle condition or using both vehicle conditions but weighting them equally.

The following is a description of the logic used to determine the count number to be added to the fault counter during a detection cycle:

If slip flag=True (AND) (Wheel Velocity Differential$_{front}$*Wheel Velocity Differential$_{rear}$<0),
then fault_count=fault_+weighting value$_1$;
if slip flag=True (AND) ratio flag=True
then fault_count=fault_count+weighting value$_2$;
if slip flag=False (AND) ratio flag=True
then fault_count=fault_count+weighting value$_3$;
if slip flag=False (AND) ratio flag=False
then fault_count=fault_count+weighting value$_4$;
where each respective weighting value is a predetermined value. Weighting value$_3$ and weighting value$_4$ may be a zero value or a negative value.

The first predetermined threshold is set to a respective number (e.g., 500). The fault count must reach the first predetermined threshold within a single brake apply to be considered a failed event, otherwise, the fault count is reset to zero. The detection algorithm will continuously loop checking the slip flag and ratio flag and update the fault counter. When the fault count reaches the first predetermined threshold within a single brake apply, a fail event has occurred and a fail event counter is incremented. When the fail event count reaches a second predetermined threshold (e.g., 3), the detection system determines that a diagonal split brake failure condition is occurring and one or more secondary braking operations are disabled. The entire VSC operations may be disabled or a specific VSC operation may be disabled including the VSC understeering control.

A second failsafe condition provided to deter against a false indications that a brake failure is occurring includes resetting the fail event counter if the master cylinder pressure is above a predetermined pressure. If the master cylinder pressure is above a predetermined pressure, then an assumption is made that the braking system is operating properly with no braking failure. For example, if at any time during a brake apply the braking pressure in the master cylinder exceeds a predetermined pressure, such as 10 bar, then the braking system is assumed to be operating properly and the fail event count will be reset to zero. The predetermined pressure sensed in the master cylinder for resetting the fail event counter is set to a pressure as dictated by the specific vehicle line and its braking architecture. The detection system will thereafter monitor the system using the same process as describe herein in order to detect the fault condition in the braking system and disable the appropriate VSC operations.

Figure 3:
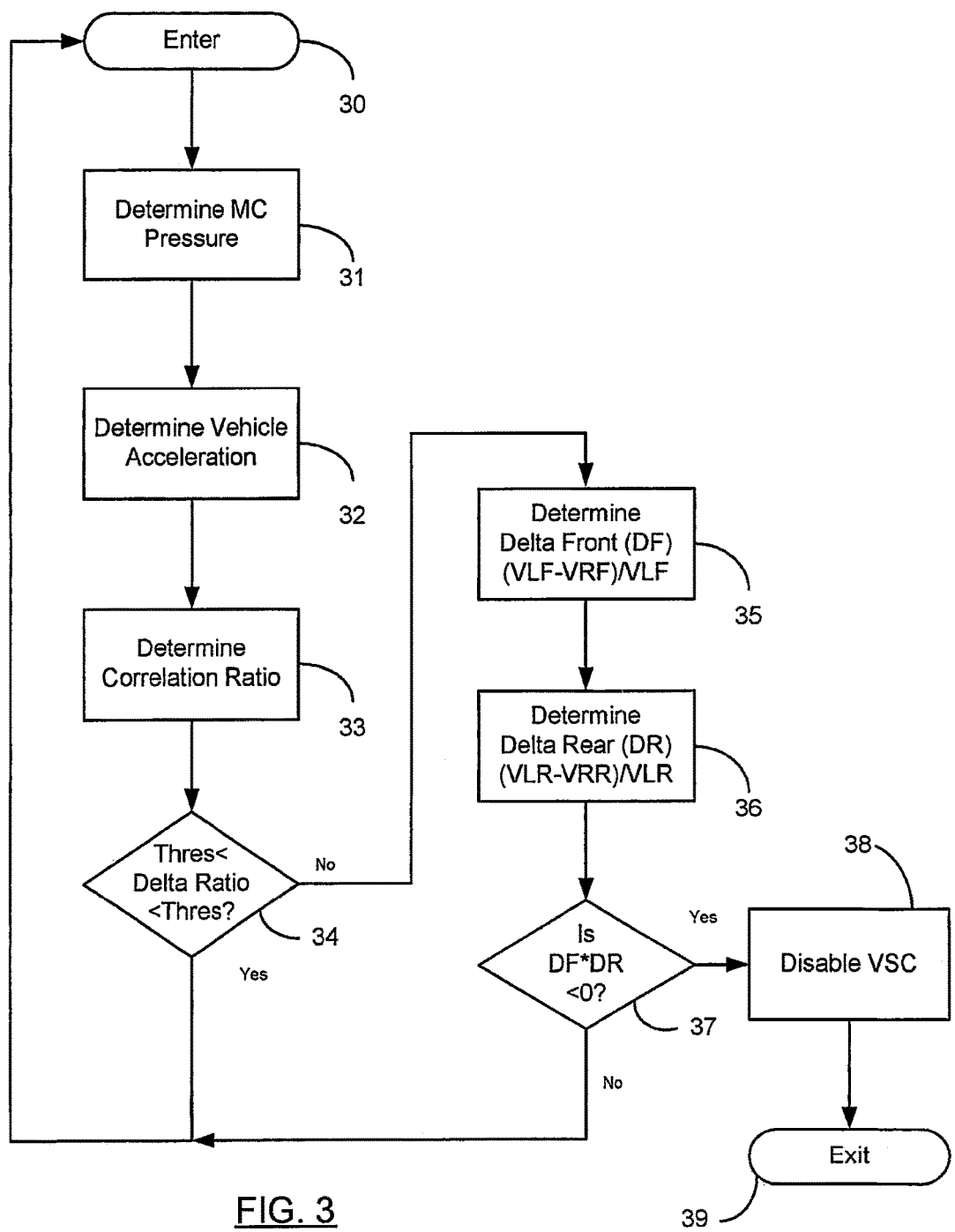
FIG. 3 is method for detecting a failure in a hydraulic brake system according to a first preferred embodiment of the present invention.

FIG. 3 illustrates method for detecting a fault condition in a hydraulic brake system of a vehicle that includes two hydraulic brake circuits each actuating a respective set of brake actuators where the system includes only one pressure sensor for sensing pressure within one of the two hydraulic brake circuits. In step 30, a routine is initiated for determining the fault condition in the hydraulic brake system. In step 31, the pressure of respective hydraulic circuit is determined from a pressure sensor sensing the respective hydraulic circuit. In step 32, the actual vehicle acceleration is determined. The actual vehicle acceleration may be determined from an accelerometer, wheel speed sensor, or input from the powertrain control module.

In step 33, a correlation ratio is determined and is defined by the ratio of the measured pressure of the respective hydraulic circuit versus the actual vehicle acceleration. In step 34, a determination is made whether the correlation ratio is within a predetermined range. If a determination is made that the correlation ratio is within the predetermined range, then a determination is made that a hydraulic brake circuit failure is not occurring and a return is made to step 31 to continuously sense for a hydraulic brake circuit failure.

If a determination is made that the correlation ratio is not within the predetermined range, then the delta slip of the front wheels are determined in step 35. In step 36, the delta slip of the rear wheels is determined. In step 37, a determination is made whether the front delta slip and the rear delta satisfy a predetermined condition. An example of satisfying the predetermined condition is to multiply the front wheel delta slip and the rear wheel delta slip and determine if the sign of the product is negative. If the product is positive, then a determination is made that the hydraulic brake circuit failure is not occurring and a return is made to step 31 to continuously sense for the hydraulic brake circuit failure. If a determination is made in step 37 that the product is negative, then a determination is made that the hydraulic brake circuit is faulted. In step 38, at least one of the vehicle stability functions is disabled so that the automated vehicle stability functions do not interfere with the driver's intended braking operation. In step 39, the routine is exited differential.

Figure 4:
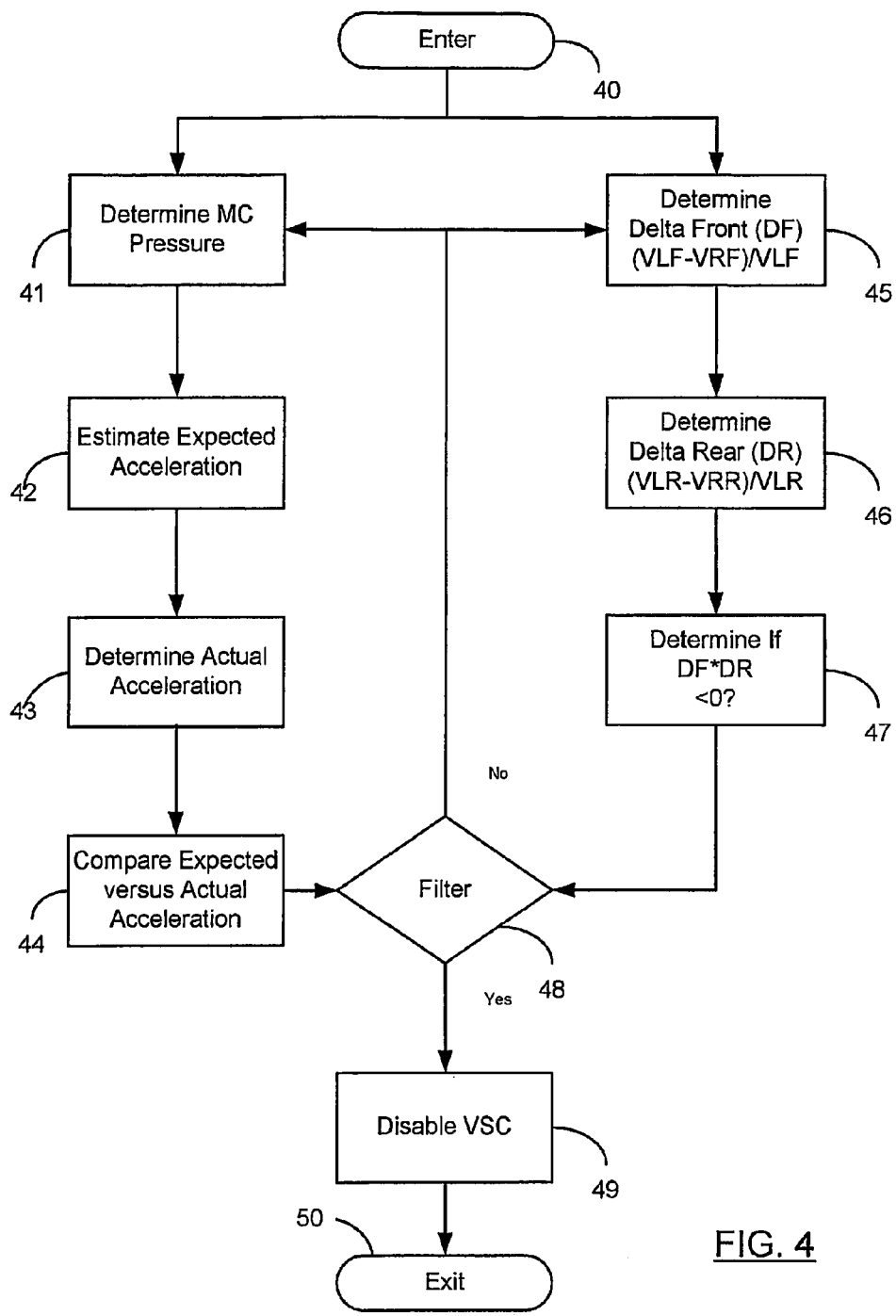
FIG. 4 is method for detecting a failure in a hydraulic brake system according to a second preferred embodiment of the present invention.

FIG. 4 illustrates a method of a second preferred embodiment for determining a hydraulic brake circuit failure utilizing only one pressure sensor in a braking system utilizing at least two hydraulic brake circuits. In step 40, two routines are initiated for determining the fault condition in a hydraulic brake system. In step 41, the first routine includes determining the pressure of respective hydraulic brake circuit based on the output of the pressure sensor. In step 42, an expected acceleration is estimated. In step 43, the actual vehicle acceleration is compared to the vehicle estimated acceleration. In step 44, a determination is made whether the actual vehicle acceleration and the vehicle estimated acceleration are within a predetermined range.

In a second routine running simultaneously with the first routine, the delta slip of the front wheels is determined in step 45. In step 46, the delta slip of the rear wheels is determined. Alternatively, wheel speed differentials may be used as opposed to delta slips. The sign of the product of delta slips is determined in step 47 by multiplying the front wheel delta slip and the rear wheel delta slip for determining whether a predetermined condition is satisfied. If the product is positive, then a determination is made for the second routine that the hydraulic brake circuit is not faulted. If the product is negative, then a determination is made for the second routine that the hydraulic brake circuit is faulted. In step 48, the actual and estimated acceleration comparison and the products of the delta slips are filtered to cooperatively determine if a hydraulic brake circuit failure is occurring. The filter process includes determining if each routine have satisfied their conditional requirements for determining hydraulic brake failure. If the determination made in step 48 is that the actual vehicle acceleration and the estimated vehicle acceleration are not within the predetermined range and if the determination made in step 47 is that the product of the delta slips was negative, then the filter, in step 48, determines that a hydraulic brake circuit fault condition is occurring and at least one of the vehicle stability functions are deactivated in step 49. The routine is then exited in step 50. Alternatively, a determination of whether both delta slips have opposite signs may be used to determine if the predetermined conditions are satisfied as opposed to multiplying the delta products (or wheel speed differentials) and producing a product.

Figure 5:
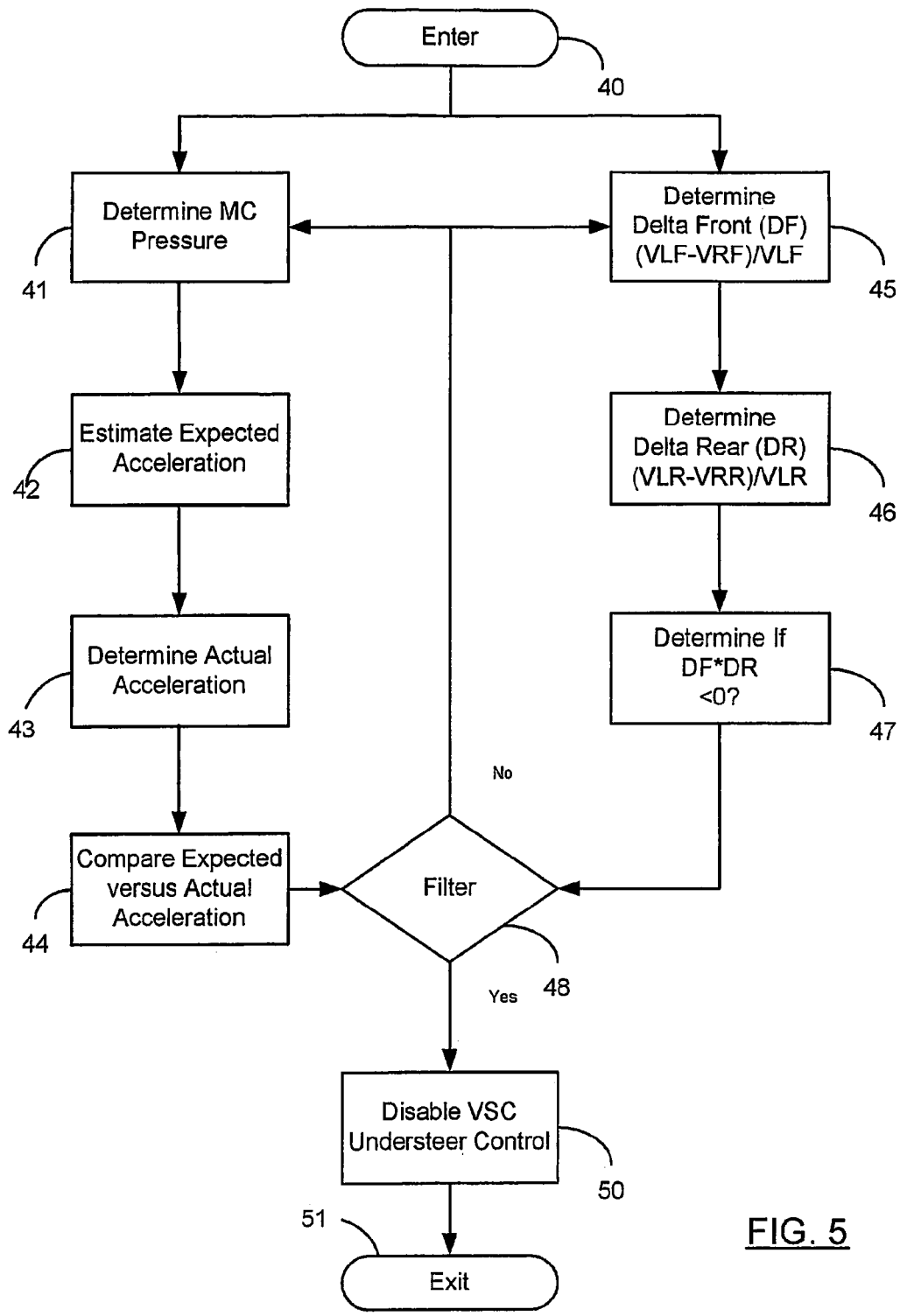
FIG. 5 is method for detecting a failure in a hydraulic brake system according to a third preferred embodiment of the present invention.

FIG. 5 is a method of a third preferred embodiment for determining a hydraulic brake circuit failure utilizing only one pressure sensor in a braking system utilizing at least two hydraulic brake circuits. Steps 40-48 are the same as that described in method shown in FIG. 4. In step 50, the vehicle stability control understeering function is disable if the determination made in step 48 is that the both conditions in step 44 and step 47 indicate respective faults. The routine is then exited in step 51.

Figure 6:
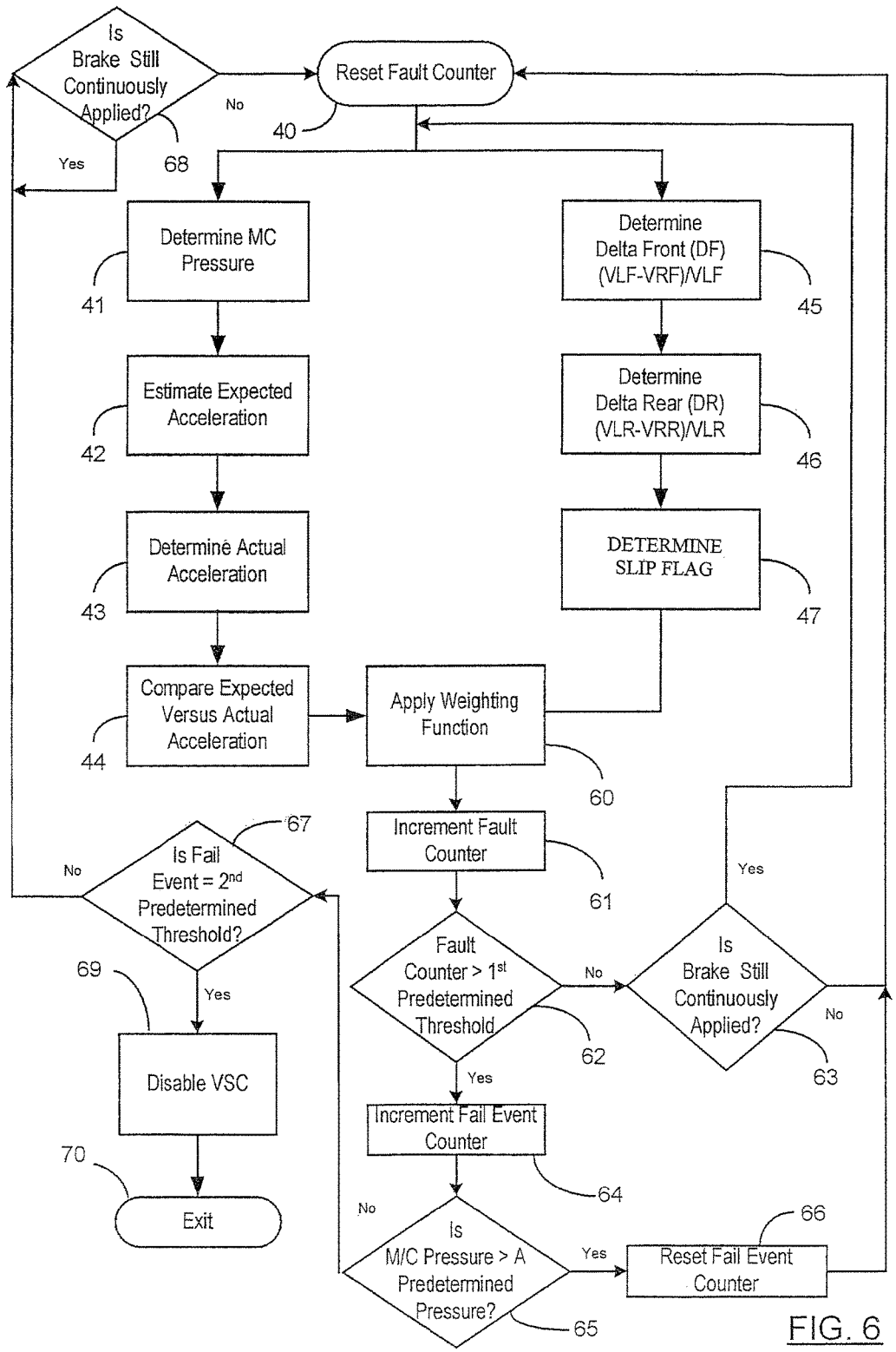
FIG. 6 is method for detecting a failure in a hydraulic brake system according to a fourth preferred embodiment of the present invention.

FIG. 6 is a method of a fourth preferred embodiment for determining a hydraulic brake circuit failure utilizing only one pressure sensor in a braking system utilizing at least two hydraulic brake circuits. Steps 40-47 are the same as that described in method shown in FIG. 4. In step 60, a weighting value is provided which is dependent upon which predetermined conditions (i.e., slip flag and ratio flag) are true or false. In step 61, the weighting value is added to the fault counter. In step 62, a determination is made whether the fault count is greater than or equal to a first predetermined threshold (e.g., 500). If the fault count is not above the first predetermined threshold, then a determination is made whether a single brake apply by the driver is still being applied in step 63. If the determination is made that the single brake is still being applied by the driver, then a return is made to step 41 and 45 to determine the status of a next ratio flag and a next slip flag. If the determination is made that the single brake is no longer being applied by the driver, then a return is made to step 40 and the fault counter is reset.

If the determination is made in step 62 that the fault counter is equal to or greater than a first predetermined threshold, then the fail event counter is updated in step 64. In step 65, a determination is made whether the braking pressure within the master cylinder is above a predetermined pressure value. If the pressure in the master cylinder is above the predetermined pressure value, then the fail event counter is reset in step 66 and a return is made to step 40 to reset the fault counter. If the pressure in the master cylinder is not greater than the predetermined pressure value, then a determination is made in step 67 of whether the fail event count is equal to a second predetermined threshold (e.g., 3).

If the fail event count is not equal to the second predetermined threshold, then a return is made to step 40 and the fault counter is reset. In the preferred embodiment, a check is made to determine whether the brake is still continuously being applied before returning to step 40. That is, the system may require that during a single continuous brake apply the fail event counter may be incremented only once. The system will wait until the brake pedal has been released for determining if a next fail event has occurred and increment the fail event counter accordingly. In an alternative embodiment, step 68 may be eliminated such that a single brake event may produce more than one fail event. That is, the counter may be incremented multiple times regardless of the brake being applied continuously or for multiple brake applies.

If the determination was made in step 67 that the fail event count is equal to the second predetermined threshold, then one or more of the VSC controls are disabled in step 69. The program is exited in step 70.

In accordance with the provisions of the patent statutes, the principle and mode of operation of the present invention have been explained and illustrated in its preferred embodiment. However, it must be appreciated that the present invention can be practiced otherwise than as specifically explained and illustrated without departing from its spirit or scope.

What is claimed is:
1. A method for detecting a fault condition in a dual circuit, diagonally split hydraulic vehicle brake system including a first circuit for actuating brakes for a first set of wheels, a second circuit hydraulically isolated and diagonally split from the first circuit for actuating brakes for a second set of wheels, a single pressure sensor for measuring brake pressure in the first circuit, and one or more vehicle operating characteristic sensors for measuring one or more vehicle operating characteristics other than the brake pressure in the first circuit, the method comprising the steps of, during a braking operation of the vehicle:
    (a) determining an expected deceleration of a vehicle based upon a measured brake pressure in the first circuit;
    (b) determining an actual deceleration of the vehicle based upon a measured one or more vehicle operating characteristics by determining a first wheel velocity difference between a first wheel of the first set of wheels and a first wheel of the second set of wheels and determining a second wheel velocity difference between a second wheel of the first set of wheels and a second wheel of the second set of wheels; and (c) detecting a fault condition in the second circuit when a correlation between the expected deceleration and the actual deceleration is a correlation between the first wheel velocity difference and the second wheel velocity difference that does not meet one or more predetermined criteria.

2. The method defined in claim 1 wherein in step (b), the measured one or more vehicle operating characteristics is a correlation of velocities of each of the first and second sets of wheels.

3. The method defined in claim 1 wherein step (c) is performed by:
   selecting a weighting value in response to the correlation between the expected deceleration value and the actual deceleration value not meeting one or more predetermined criteria and the correlation between the first wheel velocity difference and the second wheel velocity difference not meeting the one or more predetermined criteria;
   adding the selected weighting value to a fault counter;
   determining if the fault counter is equal to or greater than a predetermined threshold; and
   detecting the fault condition when the fault counter is equal to or greater than the predetermined threshold.

4. The method defined in claim 1 including the further step of determining a brake failure condition in response to a predetermined number of detected fault conditions.

5. The method defined in claim 4 including the further step of deactivating a brake modulation in response to determining of the brake failure condition.

6. The method defined in claim 4 including the further step of deactivating a vehicle stability control functionality in response to determining the brake failure condition.

7. The method defined in claim 4 including the further step of deactivating a vehicle stability understeering control functionality in response to determining the brake failure condition.

8. The method defined in claim 4 including the further step of deactivating an anti-lock braking functionality in response to determining the brake failure condition.

9. The method defined in claim 4 including the further step of deactivating a traction control functionality in response to determining the brake failure condition.

10. The method defined in claim 4 including the further step of deactivating a yaw stability functionality in response to determining the brake failure condition.

11. A dual circuit, diagonally split hydraulic vehicle brake system comprising:
    a first circuit for actuating brakes for a first set of wheels;
    a second circuit hydraulically isolated and diagonally split from the first circuit for actuating brakes for a second set of wheels;
    a single pressure sensor for measuring brake pressure in the first circuit;
    one or more vehicle operating characteristic sensors for measuring one or more vehicle operating characteristics other than the brake pressure in the first circuit; and
    a controller that (1) determines an expected deceleration of the vehicle based upon a measured brake pressure in the first circuit; (2) determines an actual deceleration of the vehicle based upon a measured one or more vehicle operating characteristics; and (3) detects a fault condition in the second circuit when a correlation between the expected deceleration and the actual deceleration does not meet one or more predetermined criteria, wherein either:
    (1) the controller determines a first wheel velocity difference between a first wheel of the first set of wheels and a first wheel of the second set of wheels, determines a second wheel velocity difference between a second wheel of the first set of wheels and a second wheel of the second set of wheels, and detects the fault condition when a correlation between the first wheel velocity difference and the second wheel velocity difference does not meet the one or more predetermined criteria; or
    the controller (a) selects a weighting value in response to the correlation between the expected deceleration value and the actual deceleration value not meeting the one or more predetermined criteria and the correlation between the first wheel velocity difference and the second wheel velocity difference not meeting the one or more predetermined criteria; (b) adds the selected weighting value to a fault counter; (c) determines if the fault counter is equal to or greater than a predetermined threshold; and (d) detects the fault condition when the fault counter is equal to or greater than the predetermined threshold.

12. The system defined in claim 11 wherein the one or more vehicle operating characteristic sensors measure velocities of each of the first and second sets of wheels.

13. The system defined in claim 11 wherein the controller performs a correlation of velocities of each of the first and second sets of wheels.

14. The system defined in claim 11 wherein the controller determines a first wheel velocity difference between a first wheel of the first set of wheels and a first wheel of the second set of wheels, determines a second wheel velocity difference between a second wheel of the first set of wheels and a second wheel of the second set of wheels, and detects the fault condition when a correlation between the first wheel velocity difference and the second wheel velocity difference does not meet the one or more predetermined criteria.

15. The system defined in claim 11 wherein the controller:
    selects a weighting value in response to the correlation between the expected deceleration value and the actual deceleration value not meeting the one or more predetermined criteria and the correlation between the first wheel velocity difference and the second wheel velocity difference not meeting the one or more predetermined criteria;
    adds the selected weighting value to a fault counter;
    determines if the fault counter is equal to or greater than a predetermined threshold; and
    detects the fault condition when the fault counter is equal to or greater than the predetermined threshold.

* * * * *